United States Patent
Zhang et al.

(10) Patent No.: US 9,420,500 B2
(45) Date of Patent: Aug. 16, 2016

(54) SETTING UP NETWORK PARAMETERS AFTER AN IDLE HANDOFF OF AN ACCESS TERMINAL IN A WIRELESS COMMUNICATIONS SYSTEM

(75) Inventors: Weiye Zhang, Beijing (CN); Jianping Zheng, Beijing (CN); Haichao Song, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/417,882

(22) PCT Filed: Sep. 5, 2012

(86) PCT No.: PCT/CN2012/080996
§ 371 (c)(1),
(2), (4) Date: Jan. 28, 2015

(87) PCT Pub. No.: WO2014/036695
PCT Pub. Date: Mar. 13, 2014

(65) Prior Publication Data
US 2015/0195754 A1 Jul. 9, 2015

(51) Int. Cl.
*H04W 36/00* (2009.01)
*H04W 48/18* (2009.01)

(52) U.S. Cl.
CPC .......... *H04W 36/0055* (2013.01); *H04W 48/18* (2013.01)

(58) Field of Classification Search
CPC .......................... H04W 36/0055; H04W 48/18
USPC ........................................................ 370/331
See application file for complete search history.

(56) References Cited

U.S. PATENT DOCUMENTS

| | | | | |
|---|---|---|---|---|
| 6,138,034 A | * | 10/2000 | Willey | H04W 68/025 340/7.32 |
| 6,195,551 B1 | * | 2/2001 | Kim | H04W 48/20 370/331 |
| 2002/0025811 A1 | * | 2/2002 | Willey | H04W 52/0216 455/434 |
| 2007/0177546 A1 | * | 8/2007 | Lee | H04W 36/0066 370/331 |
| 2010/0067485 A1 | * | 3/2010 | Rezaiifar | H04W 48/10 370/331 |

(Continued)

FOREIGN PATENT DOCUMENTS

| | | |
|---|---|---|
| CN | 102640535 A | 8/2012 |
| KR | 20110076079 A | 7/2011 |

(Continued)

OTHER PUBLICATIONS

International Search Report and Written Opinion—PCT/CN2012/080996—ISA/EPO—Jul. 4, 2013.

*Primary Examiner* — Stephen J Clawson
(74) *Attorney, Agent, or Firm* — Jia J. Wu

(57) ABSTRACT

In an embodiment, an access terminal detects that the access network has completed an idle handoff to a new access network (e.g., a new base station of a cellular network, etc.). The access terminal begins an idle handoff timer with a given expiration period in response to the detection. The access terminal eventually determines that the idle handoff timer has expired. In response to the expiration determination and before the access terminal is paged in the new access network, the access terminal sends at least one data packet to request set-up of network parameters for the access terminal within the new access network that are sufficient to permit the access terminal to receive session announcement messages within the new access network.

21 Claims, 8 Drawing Sheets

(56) References Cited

U.S. PATENT DOCUMENTS

| | | |
|---|---|---|
| 2010/0279689 A1* | 11/2010 | Tinnakornsrisuphap ............... H04W 84/045 455/435.2 |
| 2011/0128936 A1* | 6/2011 | Kim ................ H04W 36/0033 370/331 |
| 2011/0250891 A1* | 10/2011 | Zou ..................... H04W 36/04 455/437 |
| 2012/0322448 A1* | 12/2012 | Chin ................ H04W 36/0022 455/436 |

FOREIGN PATENT DOCUMENTS

| | | |
|---|---|---|
| WO | 2010127333 A1 | 11/2010 |
| WO | 2011100252 A1 | 8/2011 |
| WO | 2011126932 A1 | 10/2011 |

* cited by examiner

SETTING UP NETWORK PARAMETERS AFTER AN IDLE HANDOFF OF AN ACCESS TERMINAL IN A WIRELESS COMMUNICATIONS SYSTEM

BACKGROUND OF THE INVENTION

1. Field of the Invention

Embodiments relate to managing setting up network parameters after an idle handoff of an access terminal in a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

SUMMARY

In an embodiment, an access terminal detects that the access network has completed an idle handoff to a new access network (e.g., a new base station of a cellular network, etc.). The access terminal begins an idle handoff timer with a given expiration period in response to the detection. The access terminal eventually determines that the idle handoff timer has expired. In response to the expiration determination and before the access terminal is paged in the new access network, the access terminal sends at least one data packet to request set-up of network parameters for the access terminal within the new access network that are sufficient to permit the access terminal to receive session announcement messages within the new access network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
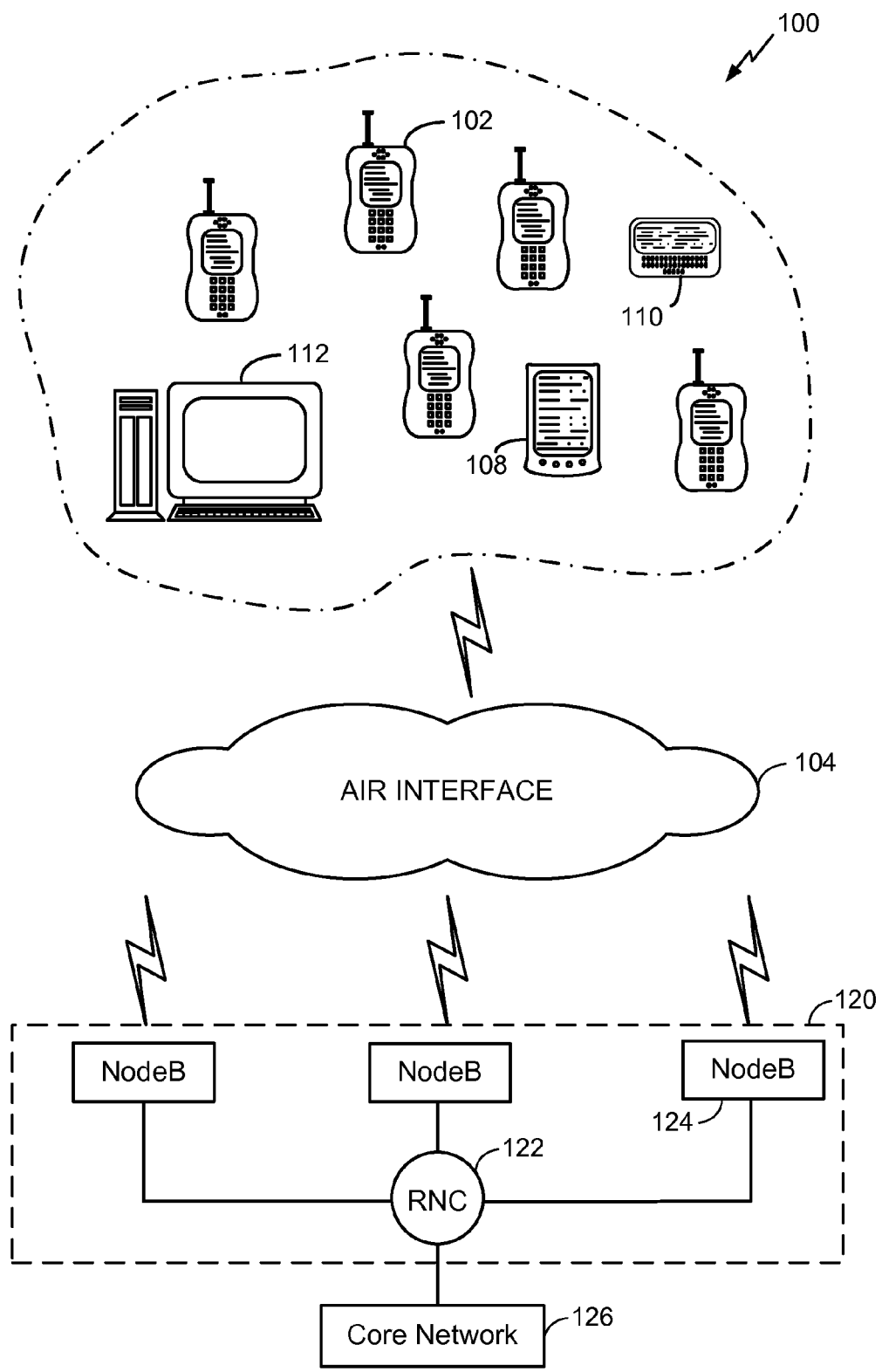
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant or tablet computer 108, a pager or laptop 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
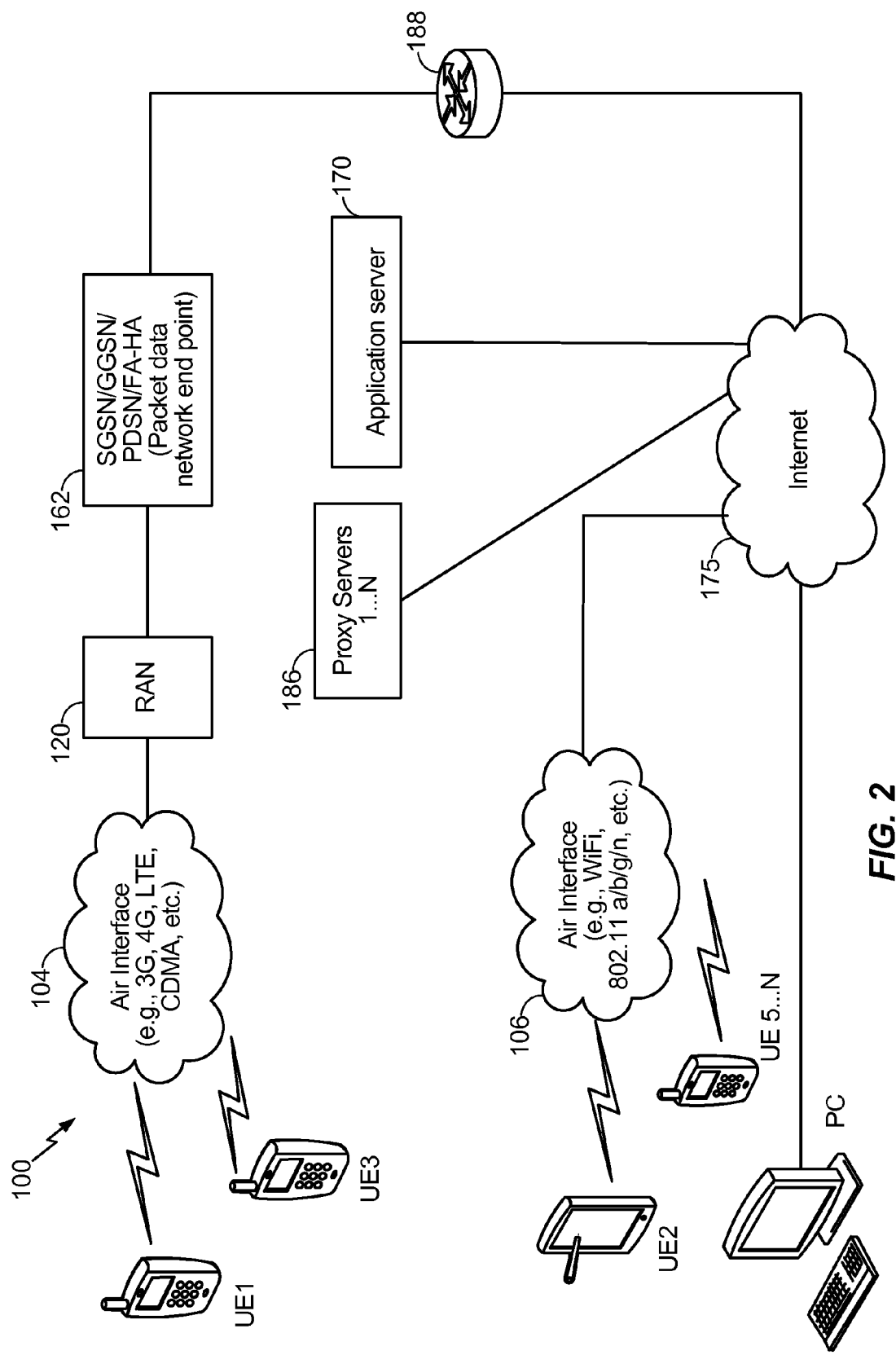
FIG. 2 illustrates a core network according to an embodiment of the present invention.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), PGW/SGW in LTE, etc.). The first packet data network end-point 162 in turn connects, via the routing unit 188, and through the routing unit 188, to the Internet 175. Through the Internet 175, the UEs 1 and 3 can connect to an application server 170 that is configured to provide one or more Internet-based services (e.g., streaming video, web-browsing, etc.). Also, through the Internet 175, UEs 1 and 3 can connect to one or more of proxy servers 1 . . . N, 186. The proxy servers 1 . . . N 186 will be described in more detail below. Generally, each of the proxy servers 1 . . . N 186 functions as a gateway between UEs 1 . . . N and servers that provide Internet-based services, such as the application server 170. UEs 2 and 5 . . . N connect to the Internet 175 via a different air interface 106, such as a WiFi or IEEE 802.11 a/b/g/n interface via a local wireless access point or hotspot. UE 4 connects directly to the Internet 175 via a wired connection (e.g., a LAN or Ethernet connection), and through the Internet 175 can then connect to any of the system components described above.

Referring to FIG. 2, UEs 1, 3 and 4 . . . N are illustrated as wireless cell-phones, UE 2 is illustrated as a wireless tablet-and/or laptop PC. However, in other embodiments, it will be appreciated that the wireless communication system 100 can connect to any type of UE, and the examples illustrated in FIG. 2 are not intended to limit the types of UEs that may be implemented within the system.

Figure 3:
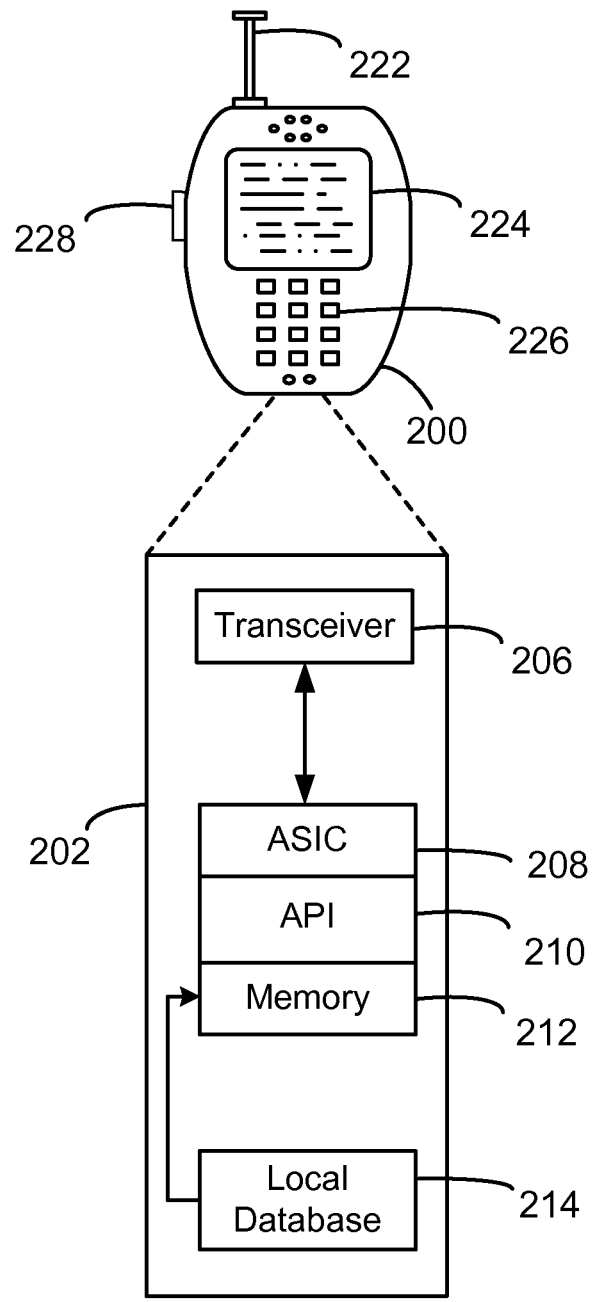
FIG. 3 is an illustration of a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet 175 and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies or transport mechanisms, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 4:
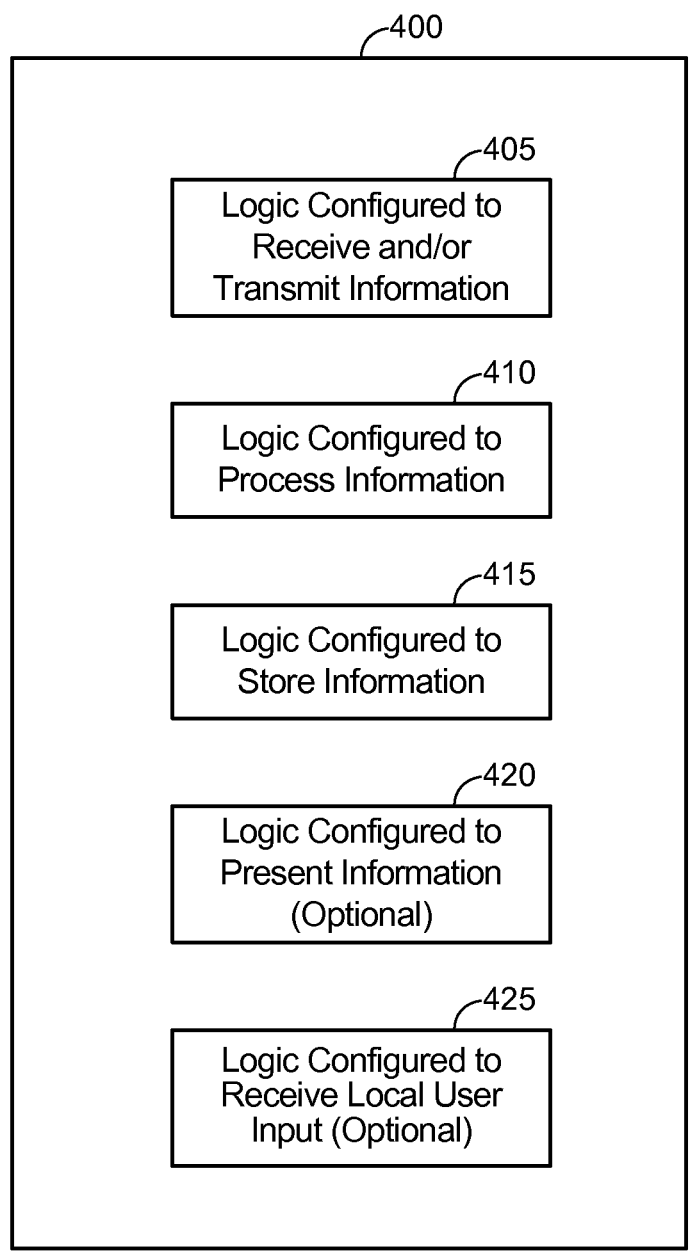
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN, GGSN, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN, GGSN, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

An idle handoff between different access networks for a given UE can affect the paging success rate of pages directed to that UE. As used herein, idle handoffs correspond to handoffs that occur for an idle UE, i.e., a UE that is powered-on but does not have an traffic channel (TCH) on which the UE is engaged in an active communication session. For example, some access networks are configured not to send downlink data to its idle UEs until after a session negotiation procedure is conducted. The session negotiation procedure, which establishes network parameters for a particular idle UE for use within a new access network, is conventionally initiated in response to an uplink packet transmission (e.g., carrying a dummy packet that prompts network parameter negotiation or set-up) from that idle UE in the new access network. The uplink packet transmission to initiate the network parameter negotiation is conventionally triggered either on a periodic basis or in response to a page from the new access network. This conventional procedure is described below with respect to FIG. 5.

Figure 5:
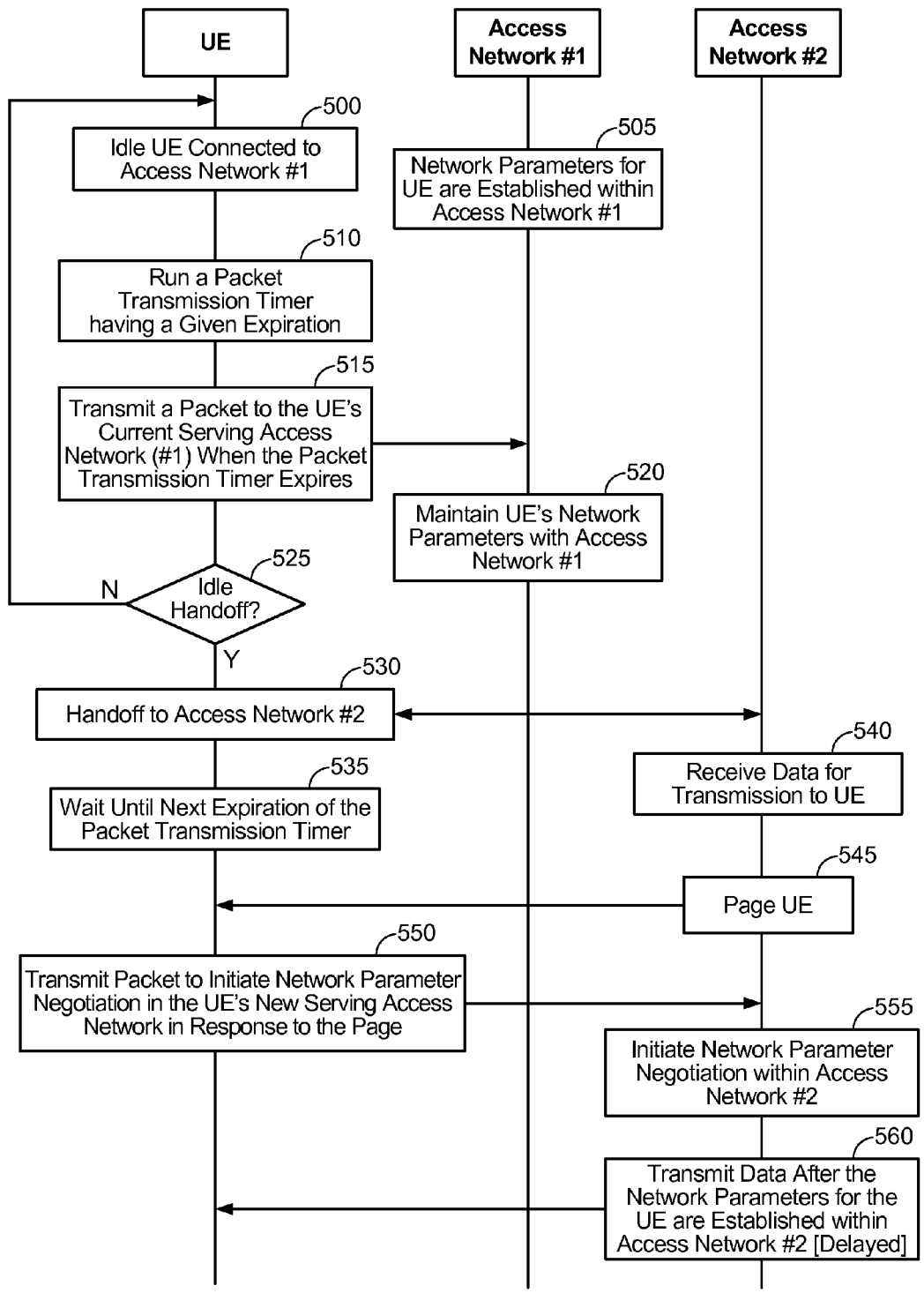
FIG. 5 illustrates a conventional process of paging a given UE undergoing an idle handoff in a wireless communications system.

FIG. 5 illustrates a conventional process of paging a given UE undergoing an idle handoff in a wireless communications system. Referring to FIG. 5, assume that the given UE is connected to a first access network, 500, that the given UE is idle, and that the given UE has already established network parameters within the first access network, 505. For example, the network parameters established by the given UE within the first access network at 505 can include settings related to idle handoffs of the given UE (e.g., SetManagementSameChannelParameters, SetManagementDifferentChannelParameters, SearchWindowSize, etc.). While the given UE is connected to the first access network, the given UE continuously runs a packet transmission timer having a given expiration period (e.g., between 1 to 3 minutes), 510. At each expiration of the packet transmission timer, the given UE transmits a reverse-link packet in its current serving access network to facilitate network parameters for the given UE to be established or maintained within the first access network, 515. For example, the reverse-link packet transmitted at 515 can correspond to a dummy packet that notifies the current serving access network with regard to the given UE's presence. Also, after each expiration of the packet transmission timer, the packet transmission timer is reset by the given UE and begins to run again, and so on. Because the first access network has already established network parameters for the given UE, these network parameters are simply renewed or maintained by the first access network in response to the packet transmission, 520.

At 525, the given UE determines whether to initiate an idle handoff to a different access network (e.g., based on an evaluation of the relevant signal strengths of pilot signals from nearby access networks, based on an evaluation of backhaul performance expectations from nearby access networks, etc.). If the given UE determines not to initiate the idle handoff to a different access network at 525, the process returns to 500 and the given UE remains connected to the first access network while periodically transmitting packets in accordance with the expiration periods of the packet transmission timer. Otherwise, the given UE initiates an idle handoff to a second access network, 530. In an example, the first and second access networks can correspond to different serving areas of a larger network that share a single radio access technology (RAT), such as different cells or sectors, different subnets, etc. Alternatively, the first and second access networks can correspond to distinct networks that serve UEs via different RATs, such as WiFi, 3G, 4G, satellite, etc.

During and after the given UE's idle handoff from the first access network to the second access network, the given UE continues to run the packet transmission timer, 535. At the next expiration of the packet transmission timer, the given UE is scheduled to transmit a reverse-link packet in its current serving access network to facilitate network parameters for the given UE to be established or maintained.

In FIG. 5, before the given UE transmits the reverse-link packet to initiate the network parameter negotiation with the second access network based on the expiration of the packet transmission timer, assume that data arrives at the second access network for transmission to the given UE, 540, and that the second access network pages the given UE, 545. For example, the data to be transmitted to the given UE can correspond to an announce message for a communication session (e.g., such as a VoIP session). Because the given UE has not yet established network parameters within the second access network, the given UE transmits a packet in response to the page message to set-up the network parameters in the second access network, 550, and the packet transmission of 550 prompts the second access network to initiate a network parameter negotiation that results in the given UE being assigned network parameters for the second access network, 555.

At this point, after the network parameter negotiation of 555, the data arriving from 540 can now be transmitted to the given UE, 560. While not shown explicitly in FIG. 5, after the given UE transmits the packet at 550, the packet transmission timer is reset and the given UE will continue to transmit the packet each time the packet transmission timer expires while the given UE is connected to the second access network.

With respect to FIG. 5, relying upon the packet transmission timer to control when the packet transmission of 550 occurs following an idle handoff results in a period of time where the given UE does not have network parameters established in its new access network. Thus, data to be transmitted to the given UE is delayed because the given UE's new access network needs to set-up the network parameters in conjunction with paging the given UE. This delay can cause a call failure scenario for certain delay-sensitive communication sessions, such as Voice-over-Internet-Protocol (VoIP) sessions, Push-to-Talk (PTT) sessions or Push-to-Transfer (PTX) sessions. Accordingly, embodiments of the invention relate to more closely aligning the packet transmissions that trigger network parameter negotiation with idle handoffs while reducing the number of idle packet transmissions.

Figure 6:
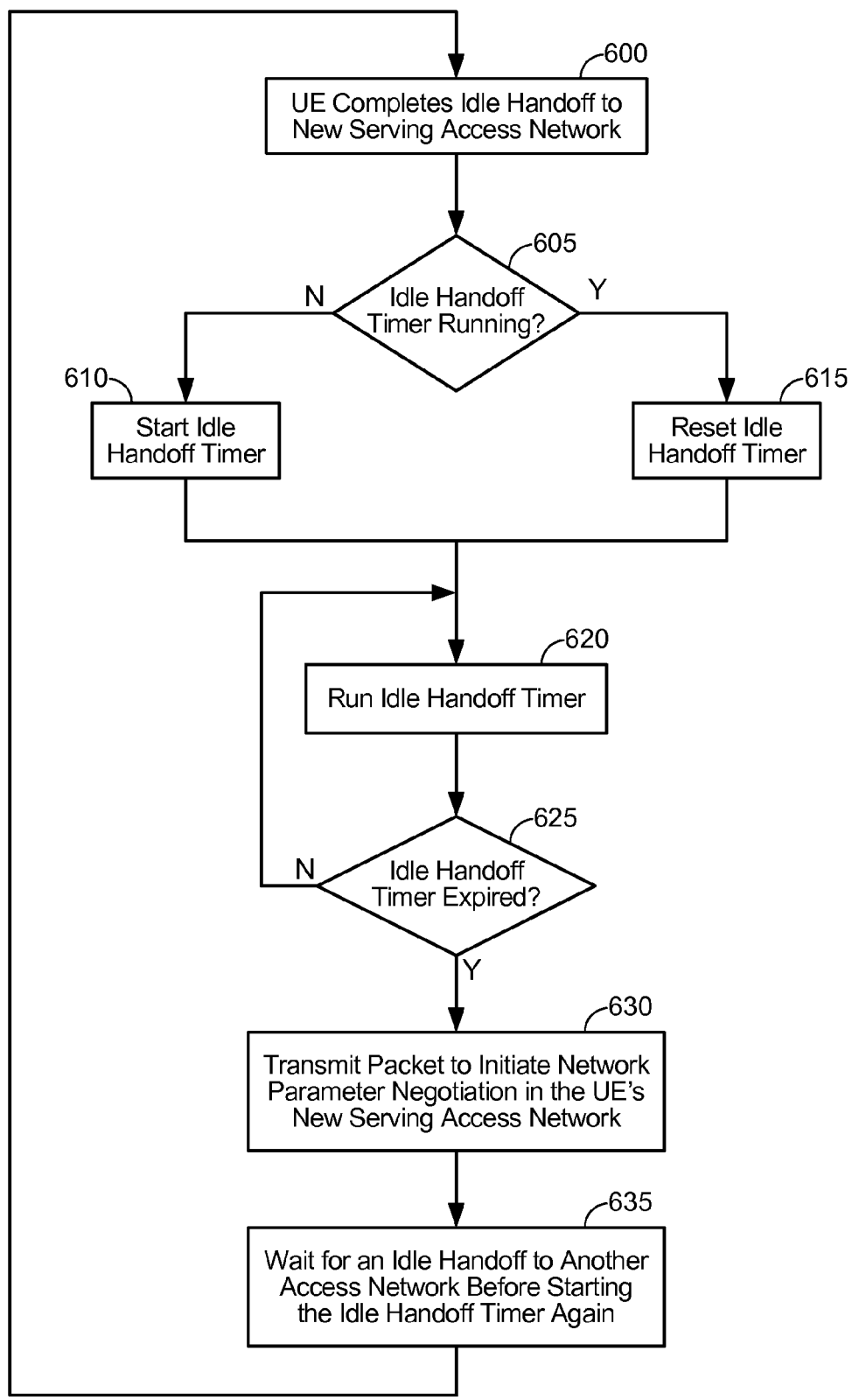
FIG. 6 illustrates a process of operating a given UE during idle handoffs in accordance with an embodiment of the invention.

FIG. 6 illustrates a process of operating a given UE during idle handoffs in accordance with an embodiment of the invention. Referring to FIG. 6, the given UE does not execute the packet transmission timer as in FIG. 5 to control packet transmissions for triggering initiation of network parameter negotiation. Instead, the given UE relies upon a separate idle handoff timer with a given expiration period (e.g., between 2 and 5 seconds) for controlling packet transmissions for triggering initiation of network parameter negotiation. The given expiration period of the idle handoff timer will generally be shorter than the given expiration period of the packet transmission timer from FIG. 5. The reason for the difference in their respective expiration periods is that the handoff timer is used to limit network negotiation procedures in the event of a ping-pong scenario (discussed below in more detail), whereas the packet transmission timer from FIG. 5 is functionally a keep-alive packet for network parameters in a particular access network.

In a further example, the given expiration period of the idle handoff timer can be dynamically determined based on network conditions. For example, if network conditions are unstable such that ping-ponging is occurring frequently, the given expiration period can be configured to be longer than if network conditions are stable. Examples of parameters from which the network conditions can be inferred include, but are not limited to, radio frequency (RF) conditions, signal strength conditions and/or reaction times associated with one or more target access networks for an idle handoff. Generally, if one or more of these parameters indicate that a network performance level is below a performance level threshold, the given expiration period of the handoff timer can be increased (or extended) to account for the higher ping-ponging probability. On the other hand, if one or more of these parameters indicate that the network performance level is not below a performance level threshold, the given expiration period of the idle handoff timer can be decreased to account for the lower ping-ponging probability so that the network parameters can be established even more quickly following an idle handoff.

Referring to FIG. 6, after completing an idle handoff off to a new access network, 600, the given UE determines whether the idle handoff timer is already running on the given UE,

605. Generally, in the process of FIG. 6, the idle handoff timer is started or reset in response to a detection that the given UE has undergone an idle handoff, so the idle handoff timer will already be running at 605 if the given UE is "ping-ponging" between access networks (e.g., the given UE is moving back and forth between access networks or base stations in a relatively short span of time). If the idle handoff timer is determined not to be already running, the idle handoff timer is started at 610. Otherwise, if the idle handoff timer is determined to already be running at 605, the idle handoff timer is reset at 615. Irrespective of whether the idle handoff timer is started (610) or reset (615), the idle handoff timer runs at 620.

While the idle handoff timer is running at 620, the given UE monitors the idle handoff timer to determine whether or not the idle handoff timer has reached its given expiration period, 625. If the given UE determines that the idle handoff timer has not yet reached its given expiration period at 625, the idle handoff timer continues to run at 620. While not shown explicitly in FIG. 6, if the given UE completes an idle handoff to yet another access network during 620 before the idle handoff timer is determined to expire at 625, the process will return to 600 and the idle handoff timer will be reset at 615. As will be appreciated, this can occur multiple times in a ping-ping scenario. Otherwise, if the given UE determines that the idle handoff timer has reached its given expiration period at 625, the given UE transmits a packet (e.g., a dummy packet) within its new access network to initiate network parameter negotiation, 630. After the network parameter negotiation is performed, the given UE can be paged and can receive data (e.g., session announce messages) without delays associated with network parameter establishment, as in FIG. 5. For example, the downlink data that can be transmitted more quickly after an idle handoff using the process of FIG. 6 can include announce messages for VoIP, PTT and/or PTX sessions, such that the success rate for announcing VoIP, PTT and/or PTX sessions can be increased by more quickly triggering initiation of the network parameter negotiation (e.g., because the delay between the transmission of the page message and the transmission of the subsequent announce message is reduced, and certain delay-sensitive calls such as VoIP calls automatically fail calls if call set-up takes too long). Instead of automatically resetting the idle handoff timer after the expiration detection of 625, the given UE waits for another idle handoff to another access network before the idle handoff timer is started again, 635. As will be appreciated, this reduces the number of packets that are transmitted by the given UE as compared to FIG. 5 (e.g., because FIG. 5 relies upon a continuous periodic transmission of packets via the packet transmission timer), while also ensuring that the given UE will establish network parameters relatively quickly upon completing an idle handoff into a new access network.

Figure 7A:
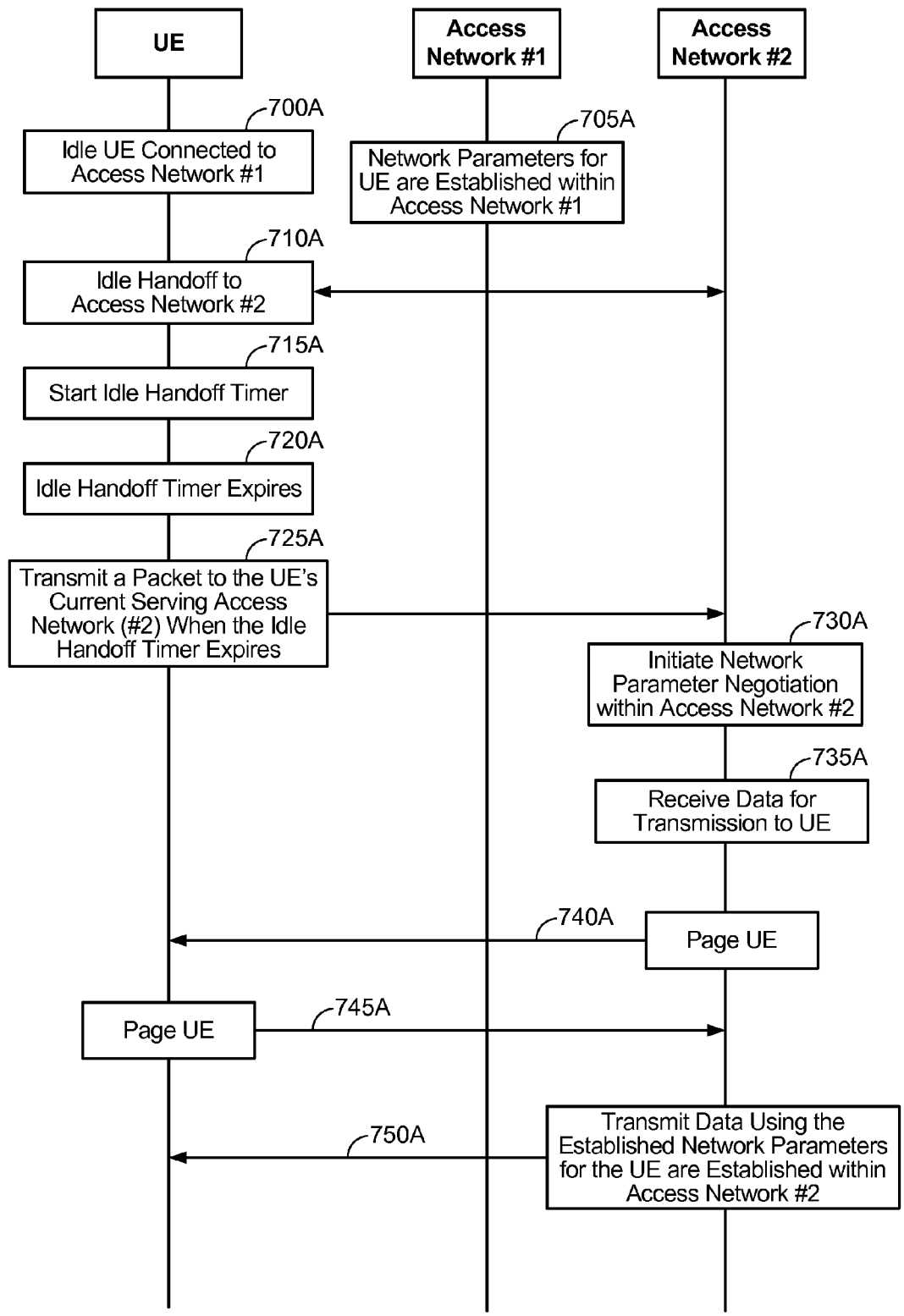
FIG. 7A illustrates an example implementation of the process of FIG. 6 in accordance with an embodiment of the invention.

FIG. 7A illustrates an example implementation of the process of FIG. 6 in accordance with an embodiment of the invention. Referring to FIG. 7A, assume that the given UE is connected to a first access network and that the given UE is idle, 700A, and that the given UE has already established network parameters within the first access network, 705A. As discussed above, for the network parameters established by the given UE within the first access network at 705A can include settings related to idle handoffs of the given UE (e.g., SetManagementSameChannelParameters, SetManagementDifferentChannelParameters, SearchWindowSize, etc.). Unlike FIG. 5, the given UE does not transmit packets periodically to the first access network based on the periodic handoff transmission timer in FIG. 6. At some later point in time, the given UE completes an idle handoff from the first access network to a second access network, 710A (e.g., as in 600 of FIG. 6). After the given UE completes the idle handoff to the second access network in 710A, the given UE starts the idle handoff timer, 715A (e.g., as in 610 of FIG. 6), and the idle handoff timer is eventually determined to reach its expiration period, 720A (e.g., as in 625 of FIG. 6). After the idle handoff timer is determined to have expired at 720A, the given UE transmits a packet within the second access network to initiate network parameter negotiation, 725A (e.g., as in 630 of FIG. 6). The packet transmission of 725A prompts the second access network to initiate a network parameter negotiation that results in the given UE being registered to receive downlink data (e.g., announce messages for communication sessions, etc.) within the second access network, 730A.

Referring to FIG. 7A, after the network parameter negotiation from 730A is completed in the second access network, assume that data arrives at the second access network for transmission to the given UE, 735A, that the second access network pages the given UE, 740A, and that the given UE transmits a page response to the second access network, 745A. For example, the data to be transmitted to the given UE can correspond to an announce message for a communication session (e.g., such as a VoIP session). At this point, the given UE is no longer idle. Because the given UE has established network parameters within the second access network, the second access network transmits the data to the given UE without having to wait for the network parameters to be set-up, 750A. As will be appreciated, if the downlink data transmitted to the given UE is related to an announcement of a delay-sensitive communication session, the earlier transmission of the downlink data at 750A as compared to 560 of FIG. 5 can increase the success rate of the session.

Figure 7B:
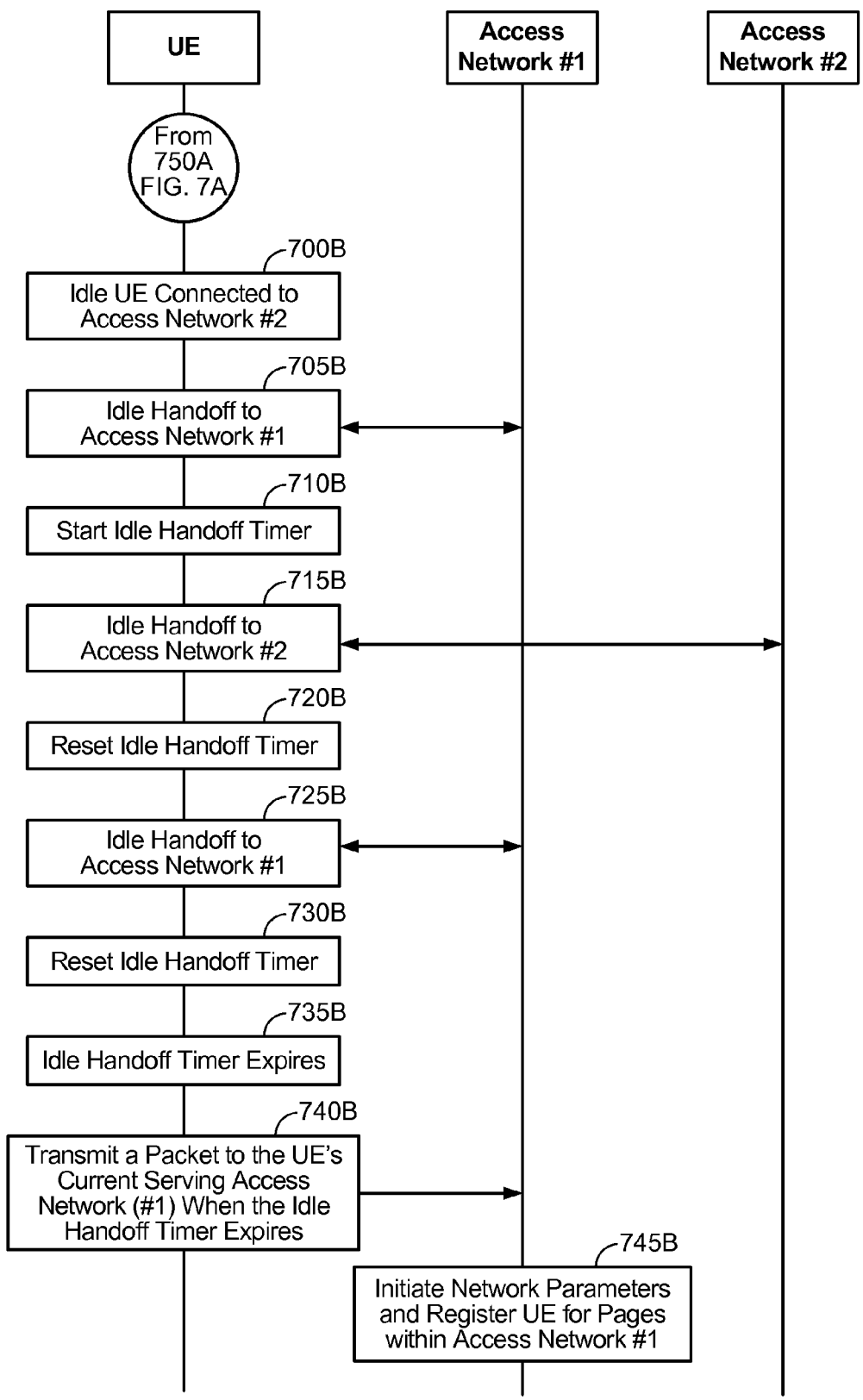
FIG. 7B illustrates a continuation of the process of FIG. 7A in accordance with an embodiment of the invention.

FIG. 7B illustrates a continuation of the process of FIG. 7A in accordance with an embodiment of the invention. Referring to FIG. 7B, after 750A of FIG. 7A, the given UE is connected to the second access network and has returned to an idle mode, 700B. At some later point in time, the given UE completes an idle handoff back to the first access network, 705B (e.g., as in 600 of FIG. 6), and starts the idle handoff timer, 710B (e.g., as in 610 of FIG. 6). Before the idle handoff timer started at 710B expires, the given UE completes another idle handoff back to the second access network, 715B (e.g., as in 600 of FIG. 6), and resets the idle handoff timer, 720B (e.g., as in 615 of FIG. 6). Before the idle handoff timer from 720B expires, the given UE completes another idle handoff back to the first access network, 725B (e.g., as in 600 of FIG. 6), and resets the idle handoff timer, 730B (e.g., as in 615 of FIG. 6). This quick series of idle handoffs of the given UE back and forth between the first and second access networks is an example of a ping-pong scenario. After the given UE's idle handoff to the first access network in 725B, assume that the given UE stops ping-ponging. Accordingly, the idle handoff timer that is reset at 730B eventually expires, 735B (e.g., as in 625 of FIG. 6). After the idle handoff timer from 730B is determined to have expired at 735B, the given UE transmits a packet (e.g., a dummy packet) within the first access network to initiate network parameter negotiation, 740B (e.g., as in 630 of FIG. 6). The packet transmission of 740B prompts the first access network to initiate a network parameter negotiation that results in the given UE being registered to receive downlink data (e.g., such as announce message for delay-sensitive communication sessions) within the first access network, 745B.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of handing off an access terminal in a wireless communications system, comprising:
    detecting that the access terminal has completed an idle handoff to a new access network;
    beginning an idle handoff timer with a given expiration period in response to the detection;
    determining that the idle handoff timer has expired; and
    sending, in response to the expiration determination and before the access terminal is paged in the new access network, at least one data packet to request set-up of network parameters for the access terminal within the new access network that are sufficient to permit the access terminal to receive session announcement messages within the new access network.

2. The method of claim 1, wherein the idle handoff timer is configured to be reset in response to each subsequent idle handoff of the access terminal that occurs before the idle handoff timer expires.

3. The method of claim 1, further comprising:
    detecting that the access terminal has completed another idle handoff to another access network before the idle handoff timer expires; and
    resetting the idle handoff timer in response to the detection that the access terminal has completed the another idle handoff to the another access network.

4. The method of claim 1, wherein the beginning of the idle handoff timer includes:
    determining that the idle handoff timer is already running when the access terminal is detected to have completed the idle handoff to the new access network; and
    resetting the idle handoff timer in response to the determination that the idle handoff timer is already running.

5. The method of claim 1, wherein the beginning of the idle handoff timer includes:
    determining that the idle handoff timer is not already running when the access terminal is detected to have completed the idle handoff to the new access network; and
    starting the idle handoff timer in response to the determination that the idle handoff timer is not already running.

6. The method of claim 1, wherein the given expiration period of the idle handoff timer is dynamically determined based on one or more network conditions.

7. The method of claim 6, wherein the network conditions include one or more radio frequency (RF) conditions, one or more signal strength conditions and/or one or more reaction times associated with one or more target access networks.

8. The method of claim 6, wherein the given expiration period of the idle handoff timer is increased if the one or more network conditions indicate a performance level that is below a performance level threshold.

9. The method of claim 6, wherein the given expiration period of the idle handoff timer is decreased if the one or more network conditions indicate a performance level that is not below a performance level threshold.

10. The method of claim 1, wherein the session announcement messages are configured to announce group communication sessions.

11. The method of claim 10, wherein the group communication sessions include Push-to-Talk (PTT) and/or Push-to-Transfer (PTX) sessions.

12. The method of claim 1, wherein the session announcement messages are configured to announce one-to-one communication sessions.

13. The method of claim 12, wherein the one-to-one communication sessions include Voice-over-Internet-Protocol (VoIP) sessions.

14. The method of claim 1, further comprising:
receiving a paging message at the access terminal in the new access network;
transmitting a page response message to the new access network in response to the paging message; and
receiving downlink data in response to the page response message without initiating a procedure to set-up the network parameters.

15. The method of claim 14, wherein the downlink data corresponds to a given session announcement message.

16. The method of claim 1, wherein the given expiration period is between 2 and 5 seconds.

17. The method of claim 1,
wherein the idle handoff corresponds to a handoff from a previous base station to a new base station within a cellular communications network associated with a given radio access technology (RAT), and
wherein the new access network corresponds to the new base station.

18. The method of claim 1, wherein the idle handoff corresponds to a handoff from a previous access network that is associated with a different radio access technology (RAT) than the new access network.

19. An access terminal in a wireless communications system, comprising:
means for detecting that the access terminal has completed an idle handoff to a new access network;
means for beginning an idle handoff timer with a given expiration period in response to the detection;
means for determining that the idle handoff timer has expired; and
means for sending, in response to the expiration determination and before the access terminal is paged in the new access network, at least one data packet to request set-up of network parameters for the access terminal within the new access network that are sufficient to permit the access terminal to receive session announcement messages within the new access network.

20. An access terminal in a wireless communications system, comprising:
a processor, a memory and a transceiver configured to:
detect that the access terminal has completed an idle handoff to a new access network;
begin an idle handoff timer with a given expiration period in response to the detection;
determine that the idle handoff timer has expired; and
send, in response to the expiration determination and before the access terminal is paged in the new access network, at least one data packet to request set-up of network parameters for the access terminal within the new access network that are sufficient to permit the access terminal to receive session announcement messages within the new access network.

21. A non-transitory computer-readable medium containing instructions stored thereon, which, when executed by an access terminal in a wireless communications system, cause the access terminal to perform operations, the instructions comprising:
at least one instruction to cause the access terminal to detect that the access terminal has completed an idle handoff to a new access network;
at least one instruction to cause the access terminal to begin an idle handoff timer with a given expiration period in response to the detection;
at least one instruction to cause the access terminal to determine that the idle handoff timer has expired; and
at least one instruction to cause the access terminal to send, in response to the expiration determination and before the access terminal is paged in the new access network, at least one data packet to request set-up of network parameters for the access terminal within the new access network that are sufficient to permit the access terminal to receive session announcement messages within the new access network.

* * * * *